US009542128B2

(12) United States Patent
Suzuki et al.

(10) Patent No.: US 9,542,128 B2
(45) Date of Patent: Jan. 10, 2017

(54) PREVIEW IMAGE OF OUTPUT DATA FROM AN OUTPUT DEVICE WITH USER INPUT

(71) Applicants: Takao Suzuki, Tokyo (JP); Toshiyuki Haginoya, Tokyo (JP)

(72) Inventors: Takao Suzuki, Tokyo (JP); Toshiyuki Haginoya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/005,767

(22) Filed: Jan. 25, 2016

(65) Prior Publication Data

US 2016/0246547 A1    Aug. 25, 2016

(30) Foreign Application Priority Data

Feb. 25, 2015   (JP) .................................. 2015-035824

(51) Int. Cl.
  *G06K 15/00*   (2006.01)
  *G06F 3/12*   (2006.01)
(52) U.S. Cl.
  CPC ............. *G06F 3/121* (2013.01); *G06F 3/1207* (2013.01); *G06F 3/1234* (2013.01); *G06F 3/1256* (2013.01); *G06F 3/1259* (2013.01); *G06F 3/1285* (2013.01)
(58) Field of Classification Search
  USPC ...... 358/1.14, 1.15, 1.18, 504, 514, 405, 437
  See application file for complete search history.

(56) References Cited

U.S. PATENT DOCUMENTS

| 8,284,442 | B2 | 10/2012 | Minami |
| 2006/0066899 | A1 | 3/2006 | Yoshida |
| 2011/0141507 | A1* | 6/2011 | Kawaura ................. G06F 3/121 |
| | | | 358/1.13 |
| 2015/0181049 | A1* | 6/2015 | Morishita .............. H04N 1/001 |
| | | | 358/1.15 |

FOREIGN PATENT DOCUMENTS

| JP | 2006-127478 | 5/2006 | |
| JP | 2006218749 | * 12/2006 | ............. B41J 29/38 |
| JP | 4982404 | 7/2012 | |

* cited by examiner

*Primary Examiner* — Marcellus Augustin
(74) *Attorney, Agent, or Firm* — Duft Bornsen & Fettig LLP

(57) ABSTRACT

A non-transitory recording medium has a program recorded therein that is executable by a computer. The program causes the computer to implement functions of a detection unit configured to detect an event which occurs in an output apparatus in which intervention of a user is required, and a screen displaying unit configured to display a notification screen including information relating to the event, an instruction reception field configured to receive an instruction to cope with the event from the user, and a preview image displaying reception field configured to receive a request for displaying a preview image of the output data from the user. The screen displaying unit is configured to display the preview image of the output data which was being output by the output apparatus when the event occurred, in response to receiving the request for displaying the preview image of the output data from the user.

5 Claims, 13 Drawing Sheets

PREVIEW IMAGE OF OUTPUT DATA FROM AN OUTPUT DEVICE WITH USER INPUT

CROSS-REFERENCE TO RELATED APPLICATIONS

The present application is based on and claims the benefit of priority of Japanese Priority Application No. 2015-035824 filed on Feb. 25, 2015 with the Japanese Patent Office, the entire contents of which are hereby incorporated by reference.

BACKGROUND OF THE INVENTION

1. Field of the Invention

The disclosures herein generally relate to a non-transitory recording medium, an information processing apparatus, and an output management method.

2. Description of the Related Art

There are cases in which a user wants to confirm a print result of print data on papers without performing actual printing. A technique which displays a preview image of the print data in a Graphical User Interface (GUI) is known in the art.

Japanese Patent No. 4982404 discloses an image processing system which provides a preview image for a client apparatus in order to cause the client apparatus to display the preview image, thereby allowing a user of the client apparatus to refer to the preview image.

The preview function of the above described image processing system is for meeting the need of the user for confirming the preview of the print result before an image forming apparatus starts to perform printing. Thus, the preview function of the above described image processing system is not supposed to be used by the user after the image forming apparatus starts to perform the printing.

There are cases in which a user wants to display a preview image in order to determine an action to perform when an event requiring user intervention such as a failure has occurred after starting the printing. In the above described image processing apparatus, it is not easy to display the preview image when the event requiring the user intervention has occurred after starting the printing.

SUMMARY OF THE INVENTION

It is a general object of at least one embodiment of the present invention to provide a non-transitory recording medium, an information processing apparatus, and an output management method that substantially obviate one or more problems caused by the limitations and disadvantages of the related art.

An embodiment of the present invention provides a non-transitory recording medium having a program recorded therein that is executable by a computer. The program when executed causes the computer to implement functions of a detection unit configured to detect an event which occurs in an output apparatus which outputs output data, intervention of a user being required in the event, and a screen displaying unit configured to display a notification screen, the notification screen including information relating to the event which occurred in the output apparatus, an instruction reception field configured to receive an instruction to cope with the event from the user, and a preview image displaying reception field configured to receive a request for displaying a preview image of the output data from the user. The screen displaying unit is configured to display the preview image of the output data which was being output by the output apparatus when the event occurred, in response to receiving the request for displaying the preview image of the output data from the user.

An embodiment of the present invention also provides an information processing apparatus which includes a detection unit configured to detect an event which occurs in an output apparatus which outputs output data, intervention of a user being required in the event, and a screen displaying unit configured to display a notification screen, the notification screen including information relating to the event which occurred in the output apparatus, an instruction reception field configured to receive an instruction to cope with the event from the user, and a preview image displaying reception field configured to receive a request for displaying a preview image of the output data from the user. The screen displaying unit is configured to display the preview image of the output data which was being output by the output apparatus when the event occurred, in response to receiving the request for displaying the preview image of the output data from the user.

An embodiment of the present invention also provides an output management method executed in an output management system, the output management system including a terminal apparatus operated by a user and an information processing apparatus for managing output data from an output apparatus, the output management method including a step of detecting an event which occurs in the output apparatus, intervention of the user being required in the event and a step of displaying a notification screen, the notification screen including information relating to the event which occurred in the output apparatus, an instruction reception field configured to receive an instruction to cope with the event from the user, and a preview image displaying reception field configured to receive a request for displaying a preview image of the output data from the user. The step of displaying the notification screen is performed by displaying the preview image of the output data which was being output by the output apparatus when the event occurred, in response to receiving the request for displaying the preview image of the output data from the user.

DESCRIPTION OF THE PREFERRED EMBODIMENTS

In the following, embodiments of the present invention will be described with reference to the accompanying drawings. It should be noted that although a print system will be described below as an example of an embodiment of an output system, the present invention is not limited to this. The output system may be an output system in which an output result of electronic data is displayed as a preview image and a user can confirm the preview image.

First Embodiment

System Configuration

Figure 1:
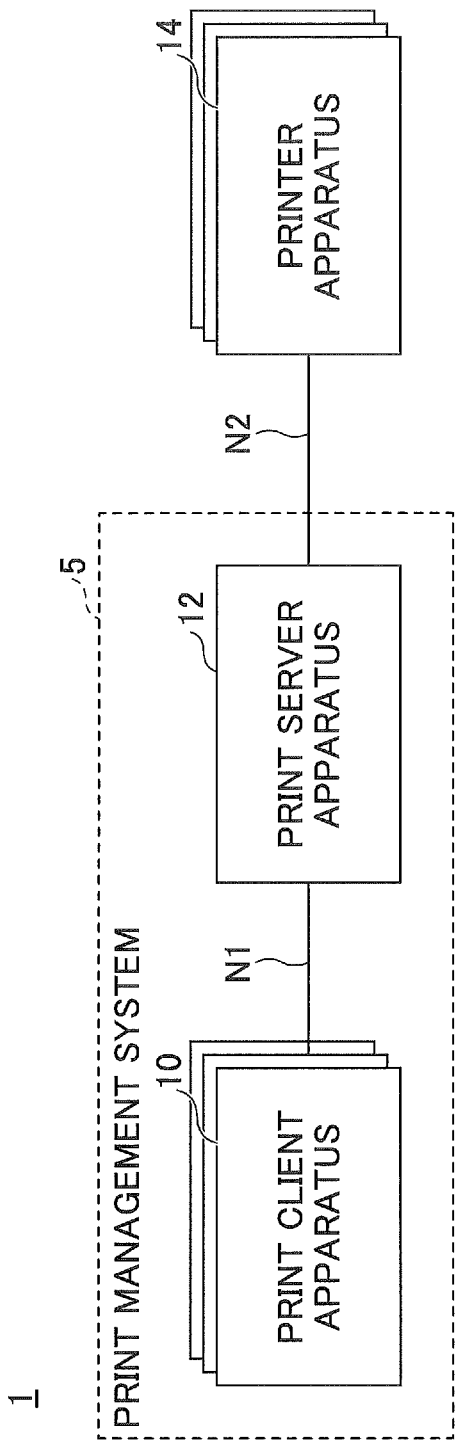
FIG. 1 is a block diagram illustrating an example of a configuration of a print system according to a first embodiment.

FIG. 1 is a block diagram illustrating an example of a configuration of a print system 1 according to a first embodiment. In the print system shown in FIG. 1, a print management system 5 is connected to one or more print apparatuses 14 via a network N2 such as a local area network (LAN). In the print management system 5, one or more print client apparatuses 10 are connected to a print server apparatus 12 via a network N1 such as the local area network (LAN). The print server apparatus 12 is connected to the one or more print apparatuses 14 via the network N2 such as the local area network (LAN). The print client apparatus 10, the print server apparatus 12, and the printer apparatus 14 are hosts of the networks N1 and N2.

The print client apparatus 10 is an information processing apparatus which is used by a user. The print client apparatus 10 may be a terminal apparatus such as a smartphone, a mobile phone, and a personal computer (PC). The print server apparatus 12 is an information processing apparatus which performs management of printing. Further, the print server apparatus 12 may be an information processing apparatus which is used by the user.

The printer apparatus 14 is an apparatus which performs transferring (prints) print data on a paper. It should be noted that the printer apparatus 14 may be a copy machine, a multifunction peripheral, or the like which includes two or more functions such as a copying function, a scanning function, a facsimile function, and the like. It should be noted that a configuration of the print system 1 shown in FIG. 1 is an example and the print system 1 may be another configuration. For example, in the print system 1 shown in FIG. 1, the print server apparatus 12 may include a plurality of information apparatuses.

<Hardware Configuration>

Figure 2:
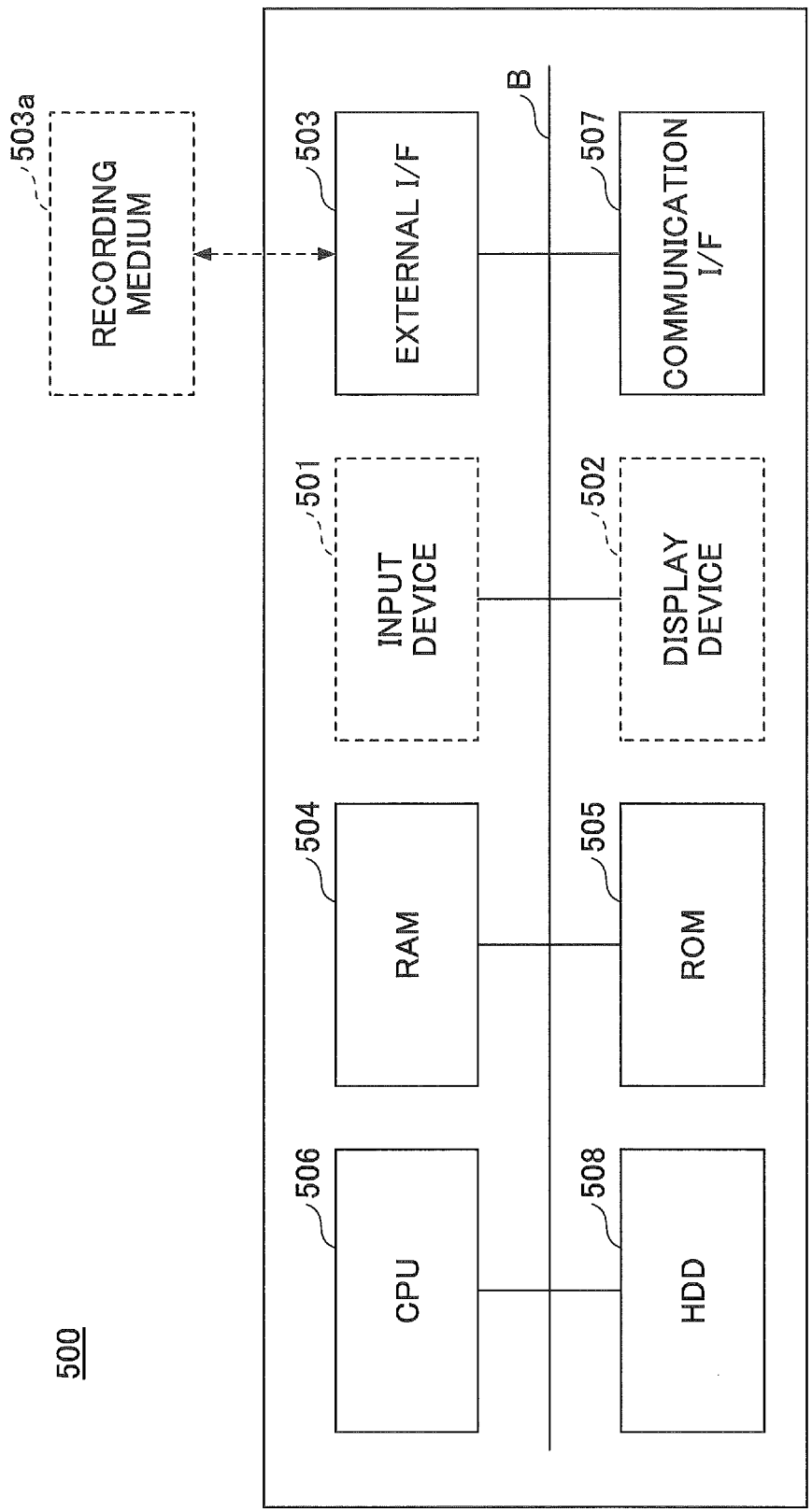
FIG. 2 is a block diagram illustrating an example of a hardware configuration of a computer of the first embodiment.

The print client apparatus 10 and the print server apparatus 12 shown in FIG. 1 may be implemented by a computer having a hardware configuration as shown in FIG. 2, for example. FIG. 2 is a block diagram illustrating an example of a hardware configuration of a computer 500.

In FIG. 2, the computer 500 includes an input device 501, a display device 502, an external I/F 503, a RAM 504, a ROM 505, a CPU 506, a communication I/F 507, and a hard disk drive (HDD) 508 that are interconnected via a bus B. It should be noted that in some embodiments, the input device 501 and the display device 502 may be connected to the computer 500 when they need to be used.

The input device 501 includes a keyboard, a mouse, a touch panel, and the like. The input device 501 is used for inputting various operation signals by the user. The display device 502 includes a display and the like. The display device 502 displays processing results of the computer 500.

The communication I/F 507 is an interface for connecting the computer 500 to the networks N1 and N2. In this way, the computer 500 may perform data communication with other computers via the communication I/F 507.

The HDD 508 is an example of a nonvolatile storage device storing programs and data. The programs and the data stored in the HDD 508 may include an operating system (OS) which is basic software and controls overall operations of the computer 500, application software (referred to as the application hereinafter) which provides various functions under the control of the OS, and the like. It should be noted that the computer 500 may use a drive apparatus (for example, a solid state drive (SSD)) which uses a flash memory as a storage medium instead of the HDD 508.

The external I/F 503 is an interface between the computer 500 and an external device. The external device may be a recording medium 503a, or the like. Thus, the computer 500 may read from and/or write on the storage medium 503a via the external I/F 503. The storage medium 503a may be a flexible disk, a compact disk (CD), a digital versatile disk (DVD), an SD memory card, a universal serial bus (USB) memory, or the like.

The ROM 505 is an example of a nonvolatile semiconductor memory (storage device) which can store programs and/or data even when the power is turned off. The ROM 505 stores programs and data such as a basic input/output system (BIOS) to be executed when the computer 500 is started, OS settings, network settings, and the like. The RAM 504 is an example of a volatile semiconductor memory (storage device) which temporarily stores programs and/or data.

The CPU 506 includes an arithmetic and logic unit which reads a program and/or data from a storage device such as the ROM 505 and/or the HDD 508, loads the program and/or data in the RAM 504, and executes processes according to the program and/or data to control the overall operations and functions of the computer 500. The print client apparatus 10 and the print server apparatus 12 of the first embodiment may implement various processes as described below using the above described hardware configuration of the computer 500.

Figure 3:
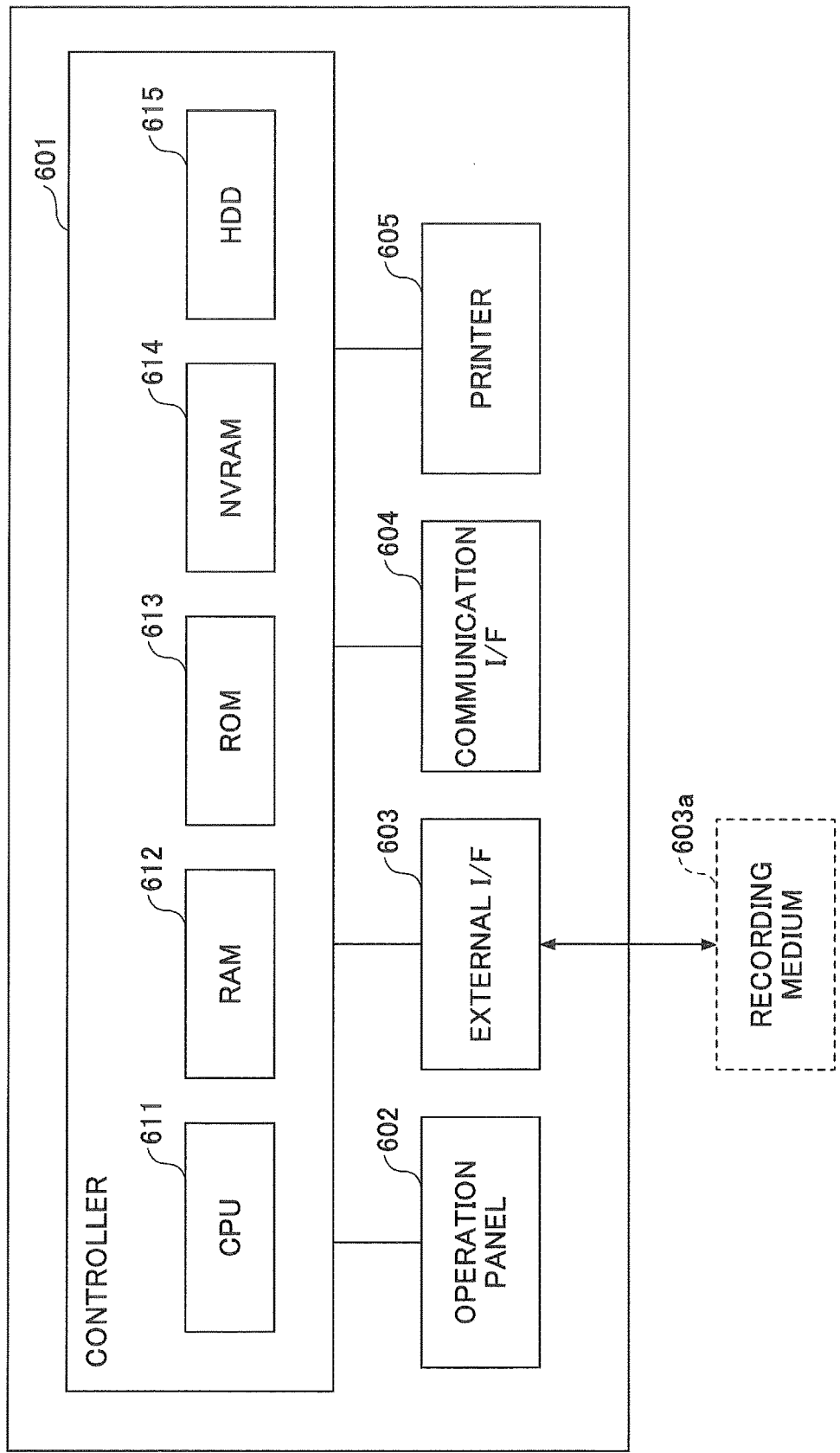
FIG. 3 is a block diagram illustrating an example of a hardware configuration of a printer apparatus according to the first embodiment.

The printer apparatus 14 shown in FIG. 1 may be implemented by a hardware configuration shown in FIG. 3, for example. FIG. 3 is a block diagram illustrating an example of the hardware configuration of the printer apparatus 14 according to the first embodiment. The printer apparatus 14 includes a controller 601, an operation panel 602, an external I/F 603, a communication I/F 604, a printer 605, and the like.

The controller 601 includes a CPU 611, a RAM 612, a ROM 613, a non-volatile RAM (NVRAM) 614, a HDD 615, and the like. The ROM 613 stores various programs and data. The RAM 612 temporarily stores programs and data. The NVRAM 614 may store setting information, for example. The HDD 615 stores various programs and data.

The CPU 611 may control the overall operations and functions of the printer apparatus 14 by loading out one or more of the programs, data, and setting information stored in the ROM 613, the NVRAM 614, or the HDD 615 onto the RAM 612, and executing processes accordingly, for example.

The operation panel 602 includes an input unit for receiving an operation input from the user, and a display unit for displaying information. The external I/F 603 is an interface between the printer apparatus 14 and an external device. The external device may be a recording medium 603a, or the like. In this way, the printer apparatus 14 may perform read/write operations on the recording medium 603a via the external I/F 603. The recording medium 603a may be an IC card, a flexible disk, a CD, a DVD, an SD memory card, a USB memory, or the like.

The communication I/F 604 is an interface for connecting the printer apparatus 14 to the network N2. In this way, the printer apparatus 14 may establish data communication with the print server apparatus 12 which is connected to the network N2 via the communication I/F 604. The printer 605 may print (transfer) print data onto a sheet such as paper (sheet).

<Software Configuration>
<Print Client Apparatus>

Figure 4:
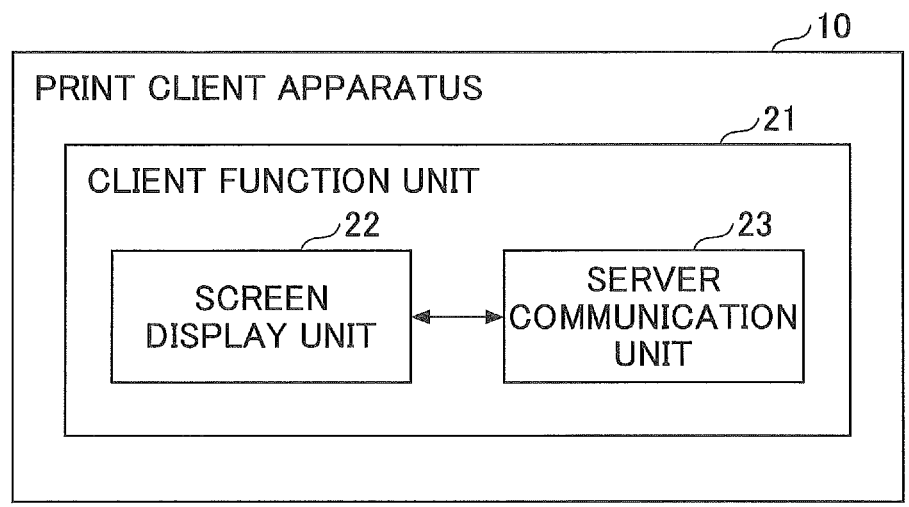
FIG. 4 is a block diagram illustrating an example of a functional configuration of a client apparatus according to the first embodiment.

The print client apparatus 10 of the first embodiment may be implemented by a functional configuration (process block) shown in FIG. 4, for example. FIG. 4 is a block diagram illustrating an example of a functional configuration (process block) of the print client apparatus 10.

The print client apparatus 10 implements a client function unit 21 by executing programs. The client function unit 21 has a configuration which includes a screen display unit 22 and a server communication unit 23.

The screen display unit 22 has a screen displaying function for performing conversation (interaction) with the user. The server communication unit 23 has a transmission function for transmitting a request to the print server apparatus 12 and a reception function for receiving a response and notification from the print server apparatus 12. The client function unit 21 may provide the user with a means for controlling the print management system 5.

<Print Server Apparatus>

Figure 5:
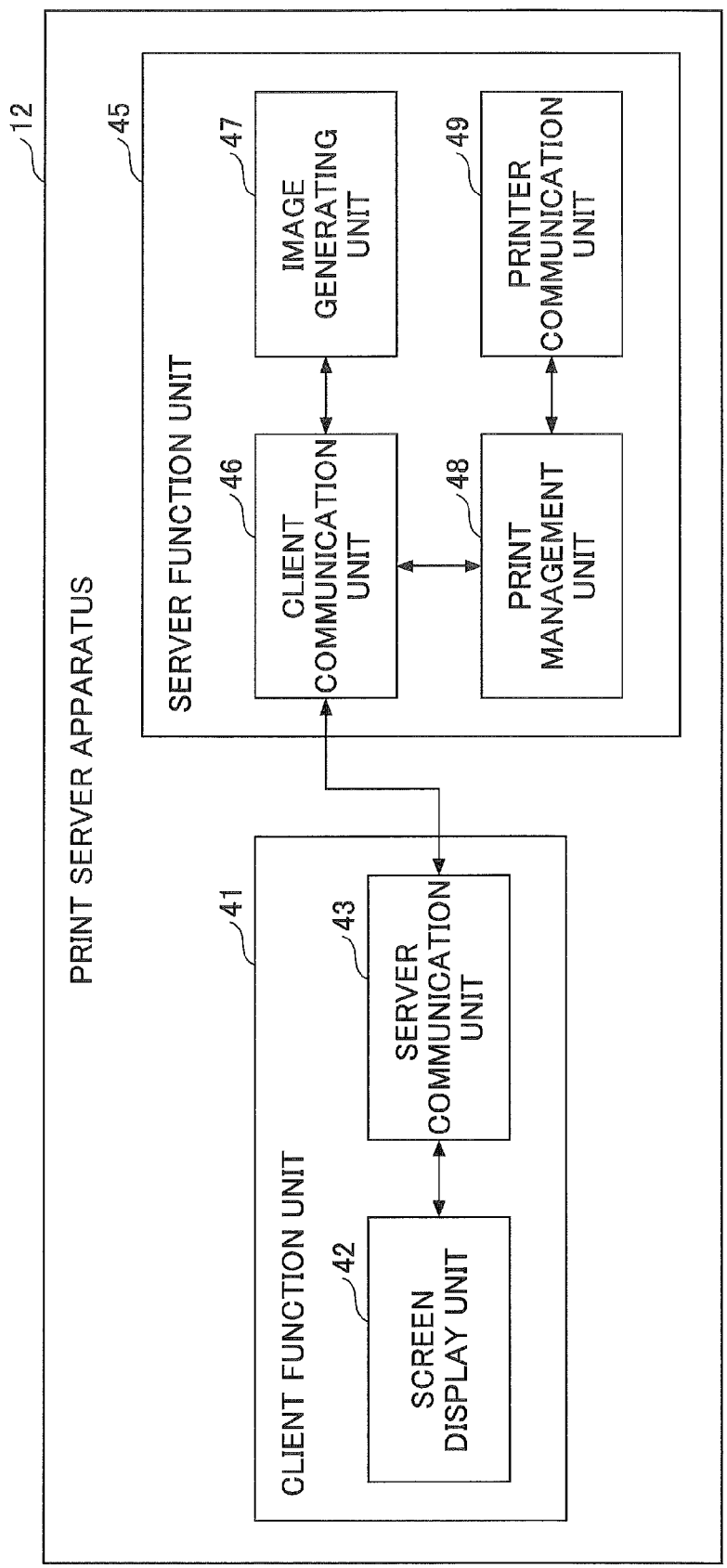
FIG. 5 is a block diagram illustrating an example of a functional configuration of a print server apparatus according to the first embodiment.

The print server apparatus 12 according to the first embodiment may be implemented by a functional configuration (process block) shown in FIG. 5, for example. FIG. 5 is a block diagram illustrating an example of a functional configuration (process block) of the print server apparatus 12 according to the first embodiment.

The print server apparatus 12 implement a client function unit 41 and a server function unit 45 by executing programs. The client function unit 41 has a configuration which includes a screen display unit 42 and a server communication unit 43. The screen display unit 42 has a screen displaying function for performing conversation (interaction) with the user.

The server communication unit 43 has a transmission function for transmitting a request to the server function unit 45 and a reception function for receiving a response and notification from the server function unit 45.

The print system 1 according to the first embodiment may be a configuration which includes at least one of the client function unit 21 of the print client apparatus 10 and the client function unit 41 of the print server apparatus 12.

The server function unit 45 includes a client communication unit 46, an image generating unit 47, a print management unit 48, and a printer communication unit 49. The client communication unit 46 has a reception function for receiving a response from the client function unit 21 of the print client apparatus 10 or the client function unit 41 of the print server apparatus 12 and a transmission function for transmitting a request and notification to the client function unit 21 or the client function unit 41.

The image generating unit 47 generates a preview image based on input print data. The print management unit 48 has a control function for controlling execution of the printing and a holding function for holding the print data. The printer communication unit 49 has a transmission function which transmits the print data to the printer apparatus 14 and a monitoring function which monitors status of the printer apparatus 14 and status of a print process. The server function unit 45 provides the client function unit 21 of the print client apparatus 10 or the client function unit 41 of the print server apparatus 12 with a print management function.

<Printer Apparatus>

Figure 6:
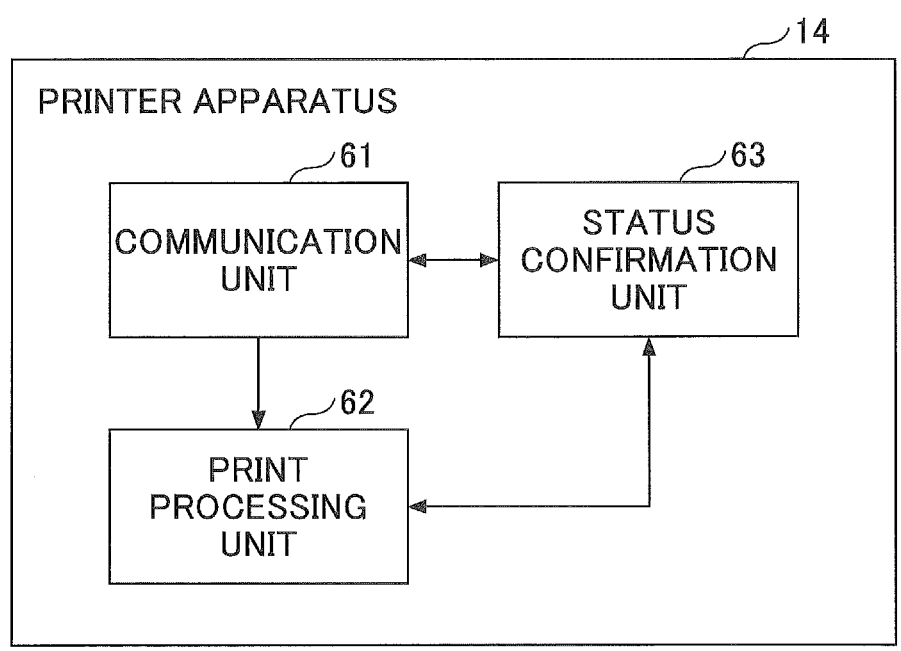
FIG. 6 is a block diagram illustrating an example of a functional configuration of the printer apparatus according to the first embodiment.

The printer apparatus 14 according to the first embodiment may be implemented by a functional configuration (process block) shown in FIG. 6, for example. FIG. 6 is a block diagram illustrating an example of a functional configuration (process block) of the printer apparatus 14. The printer apparatus 14 includes a communication unit 61, a print processing unit 62, and a status confirmation unit 63.

The communication unit 61 has a reception function for receiving the print data from the print server apparatus 12 and a confirmation request for confirming the status of the printer apparatus 14 and the print process status, and a transmission function for transmitting a confirmation response of the status of the printer apparatus 14 and the print process status.

The print processing unit 62 performs a print process which prints the received print data from the printer 605 according to print settings. The status confirmation unit 63 confirms the status of the printer apparatus 14 and the status of the print process in response to receiving the confirmation request for confirming the status of the printer apparatus 14 and the print process status. The status confirmation unit 63 transmits the confirmation response of the status of the printer apparatus 14 and the status of the print process to the print server apparatus 12 using the communication unit 61.

<Details of Process>

In the following, details of processes of the print system 1 according to the first embodiment will be described. The print system 1 according to the first embodiment may displays the preview image following the steps shown in FIG. 7, for example, when an event in which intervention of the user is required such as confirmation of papers (notification of paper confirmation), occurrence of failure, or the like has occurred after starting the printing. It should be noted that the failure may be a jam which has occurred in a conveyance path of the printer apparatus 14 or a paper-out condition on the printer apparatus 14. An example in which the user controls the print management system 5 from the client function unit 41 of the print server apparatus 12 will be described with reference to FIG. 7.

Figure 7:
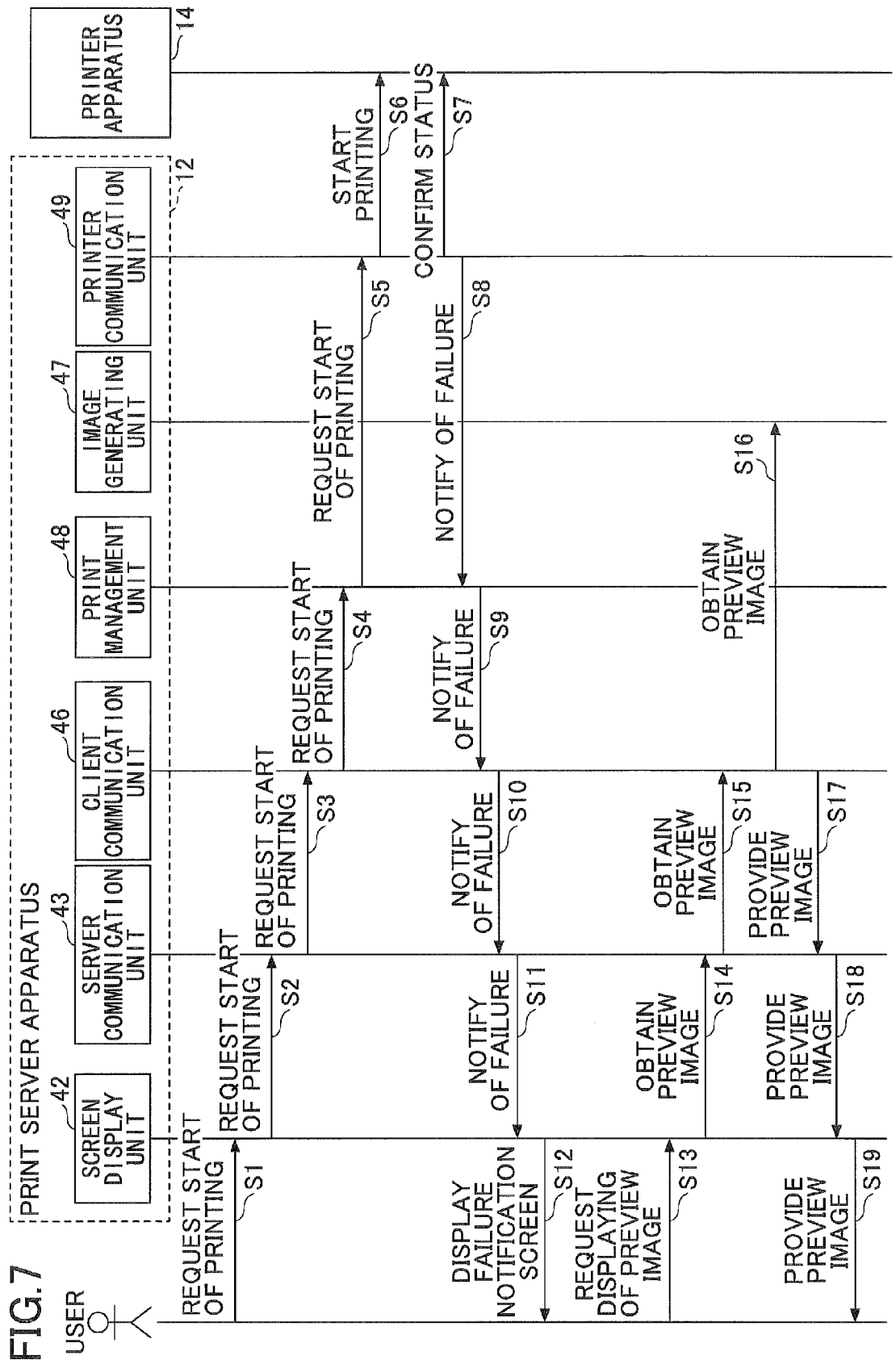
FIG. 7 is a sequence diagram illustrating an example of a preview image displaying process of the printing system according to the first embodiment.

FIG. 7 is a sequence diagram illustrating an example of a preview image displaying process of the print system 1 according to the first embodiment. In step S1, the user selects a print job for performing the printing from a print job management screen displayed in the screen display unit 42 in order to request starting of the printing. In step S2, the screen display unit 42 requests the server communication unit 43 to start the printing of the print job selected by the user.

In step S3, the server communication unit 43 requests the client communication unit 46 of the server function unit 45 to start the printing of the print job selected by the user. In step S4, the client communication unit 46 requests the print management unit 48 to start the printing of the print job selected by the user.

In step S5, the print management unit 48 requests the printer communication unit 49 to start the printing of the print job selected by the user. At that time, the print management unit 48 stores (preserves) the print data of the print job which is requested to start printing in the storage unit of the print server apparatus 12.

In step S6, the printer communication unit 49 transmits the print data of the print job selected by the user to the printer apparatus 14. The printer apparatus 14 starts a print process of the received print data.

In step S7, the printer communication unit 49 confirms the status of the printer apparatus 14 and the status of the print process with respect to the printer apparatus 14 in at every predetermined time (at constant intervals). The status of the printer apparatus 14 may be an operational status of the printer apparatus 14, an error occurrence situation or the like. The status of the print process may be progress of the print process of the print data, an error occurrence situation or the like.

The printer communication unit 49 notifies the print management unit 48 of failure information in step S8 in response to detecting the error occurrence of the printer apparatus 14 or the print process in step S7. It should be noted that the failure information may include identification information of the print job in which the error has occurred, a page number being printed at timing (point of time) when the error occurred, content of the error and the like. In step S9, the print management unit 48 notifies the client communication unit 46 of the failure information.

In step S10, the client communication unit 46 notifies the server communication unit 43 of the client function unit 41 of the failure information. In step S11, the server communication unit 43 notifies the screen display unit 42 of the failure information. In step S12, the screen display unit 42 generates a failure notification screen 1000 as shown in FIG. 8 based on the notified failure information in order to display the failure notification screen 1000 in the display device 502.

Figure 8:
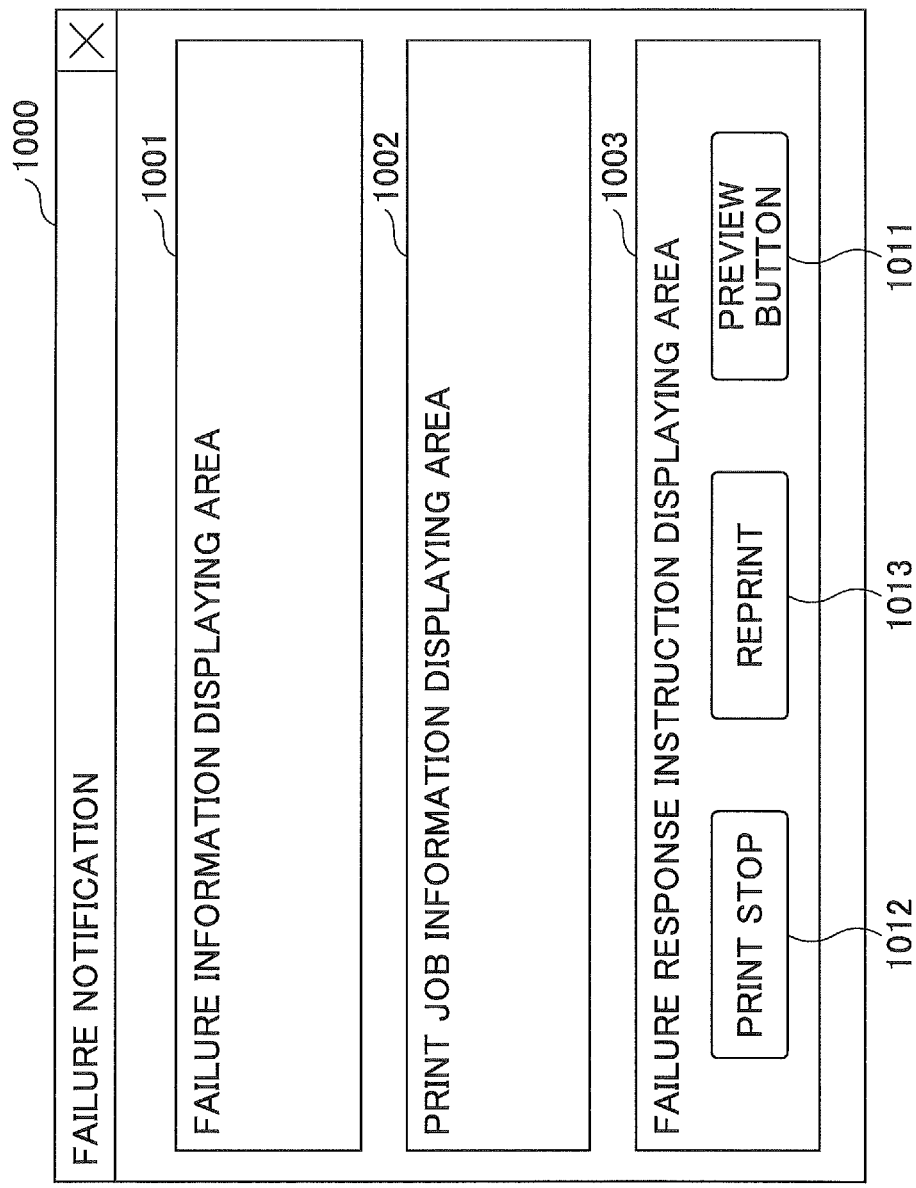
FIG. 8 is a schematic diagram illustrating an example of a failure notification screen.

FIG. 8 is a schematic diagram illustrating an example of the failure notification screen 1000. The failure notification screen 1000 shown in FIG. 8 is a configuration which includes a failure information displaying area 1001, a print job information displaying area 1002, and a failure response instruction area 1003. The failure notification screen 1000 is a screen for providing the user with the failure information and for receiving an instruction (operation) to cope with the failure from the user.

The failure information displaying area 1001 displays the content of the error occurring in the printer apparatus 14, and the page number being printed at the timing when the error occurred. The print job information displaying area 1002 displays the identification information (ID, name, or the like) of the print job in which the error has occurred.

In the failure response instruction area 1003, for receiving the instruction to cope with the failure from the user, a button, a radio button, a checkbox or the like may be arranged. In the failure response instruction area 1003 shown in FIG. 8, a print stop button 1012 and a reprinting button 1013 for performing reprinting by specifying a page from which the printing restarts are arranged. Further, in the failure response instruction area 1003, a preview button 1011 for starting a print preview screen is arranged.

The user may easily display the preview image of the print job in which the error has occurred by pushing the preview button 1011 arranged in the failure notification screen 1000. As described above, in the print system 1 according to the first embodiment, the user may easily call up the preview image displaying function of the print job in which the error has occurred from the failure notification screen 1000.

In step S13, the user requests the screen display unit 42 to display the preview image of the print job in which the error has occurred by pushing the preview button 1011 in the failure notification screen 1000. The page of the print job displayed in the preview image may be the page being printed at the timing when the error occurred or a page which has been specified by the user.

In step S14, the screen display unit 42 of the print server apparatus 12 requests the server communication unit 43 to obtain the preview image. In step S15, the server communication unit 43 requests the client communication unit 46 of the server function unit 45 to obtain the preview image.

In step S16, the client communication unit 46 requests the image generating unit 47 to obtain the preview image, and obtains the preview image. It should be noted that the image generating unit 47 may read out the print data of the print job stored in a storage unit of the print server apparatus 12 and convert the print data into the preview image.

In step S17, the client communication unit 46 provides the server communication unit 43 of the client function unit 41 with the preview image. In step S18, the server communication unit 43 provides the screen display unit 42 with the preview image provided from the client communication unit 46. In step S19, the screen display unit 42 displays the print preview screen which includes the preview image, which is provided from the server communication unit 43, in the display device 502.

Figure 9:
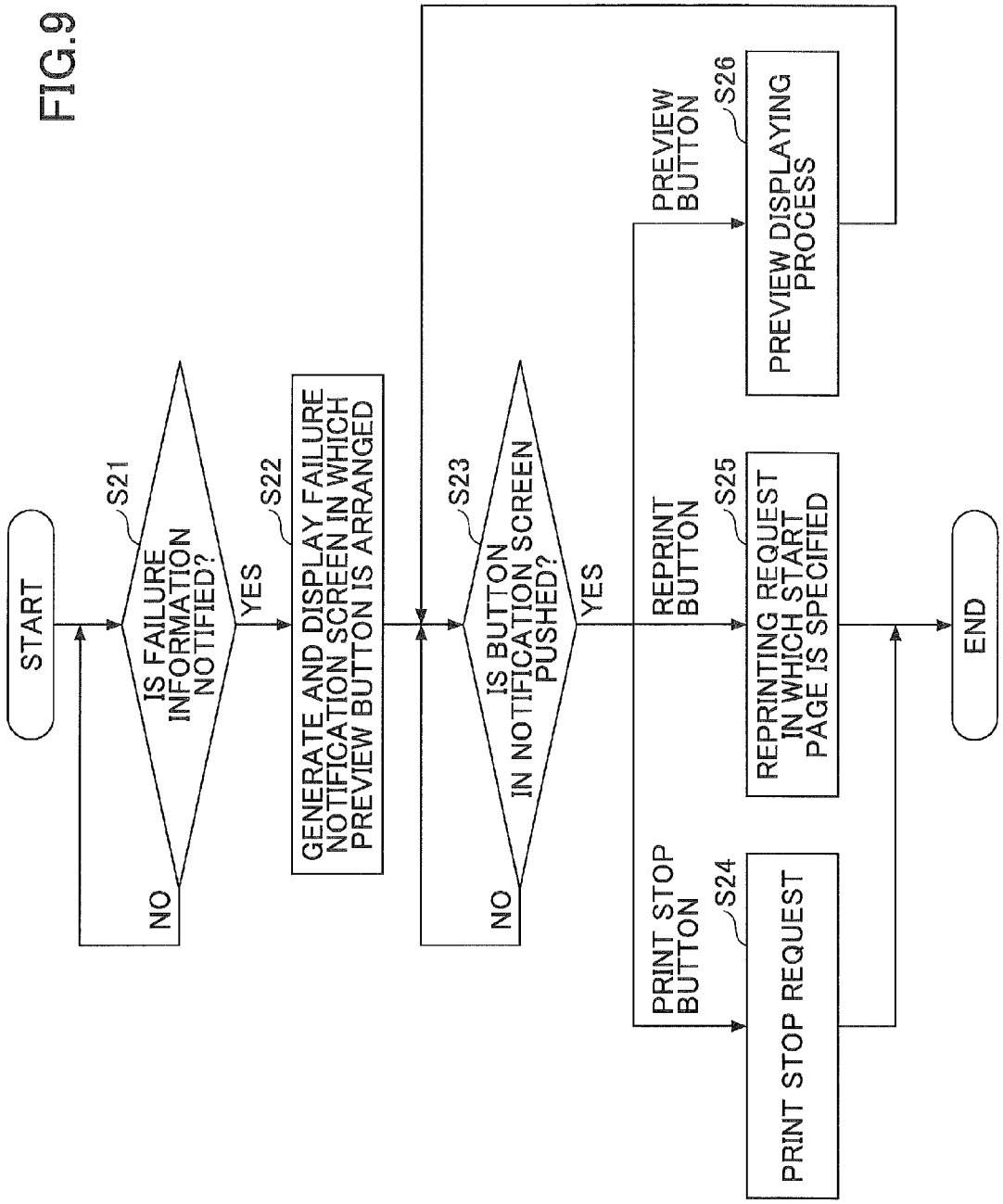
FIG. 9 is a flowchart illustrating an example of a process relating to a print preview screen.

FIG. 9 is a flowchart illustrating an example of a process relating to the print preview screen. The process goes to step S22 from step S21 when the screen display unit 42 is notified of the failure information. In response to the notification of the failure information, the failure notification screen 1000, in which the preview button 1011 is arranged, is generated as shown in FIG. 8. The screen display unit 42 displays the failure notification screen 1000, which is generated, in the display device 502.

In response to an event in which the button on the failure notification screen 1000 is pushed (YES in step S23), the screen display unit 42 goes to (perform) a process according to the pushing of the button. In response to an event in which the print stop button 1012 is pushed, the screen display unit 42 goes to step S24 and requests the server communication unit 43 to stop the printing, and the printing is stopped.

In response to pushing of the reprinting button 1013 for performing the reprinting by specifying the page from which the printing restarts, the screen display unit 42 goes to step S25. Then, the screen display unit 42 transmits, to the server communication unit 43, the reprinting request in which the start page is specified and cause to perform the reprinting in which the start page is specified. In response to pushing of the preview button 1011, the print server apparatus 12 goes to step S26 and performs the preview displaying process for causing the display device 502 to display the print preview screen as shown in step S14 to S19 in FIG. 7. After displaying the print preview screen, the screen display unit 42 returns to step S23 and continues the process.

Figure 10:
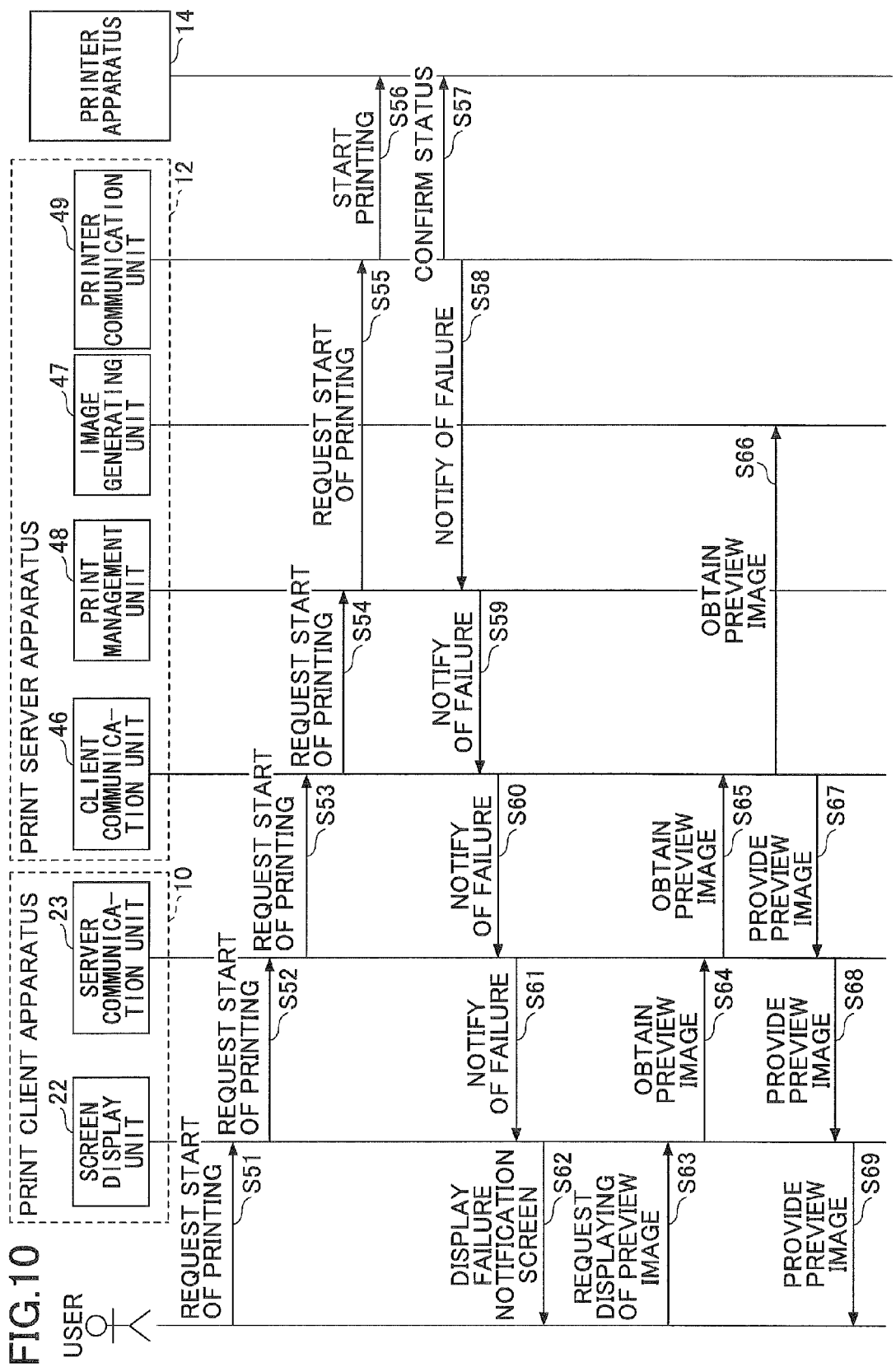
FIG. 10 is a sequence diagram illustrating another example of a preview image displaying process of the print system according to the first embodiment.

As described above, FIG. 7 shows an example in which the user controls the print management system 5 from the client function unit 41 of the print server apparatus 12. In the print system 1 according to the first embodiment, the print management system 5 may be controlled from the client function unit 21 of the print client apparatus 10 as shown in FIG. 10. FIG. 10 is a sequence diagram illustrating another example of a preview image displaying process of the print system 1 according to the first embodiment.

In the sequence diagram shown in FIG. 10, the client function unit 21 of the print client apparatus 10 requests the server function unit 45 of the print server apparatus 12 to execute the process instead of the client function unit 41 shown in the sequence diagram in FIG. 7. Since other processes of the sequence diagram in FIG. 10 are similar to the sequence diagram in FIG. 7, descriptions of the processes in FIG. 7 are omitted.

As described above, the print system 1 according to the first embodiment may request displaying of the preview image of the print job in which the error has occurred from the client function unit 21 of the print client apparatus 10 or the client function unit 41 of the server apparatus 12.

Figure 11:
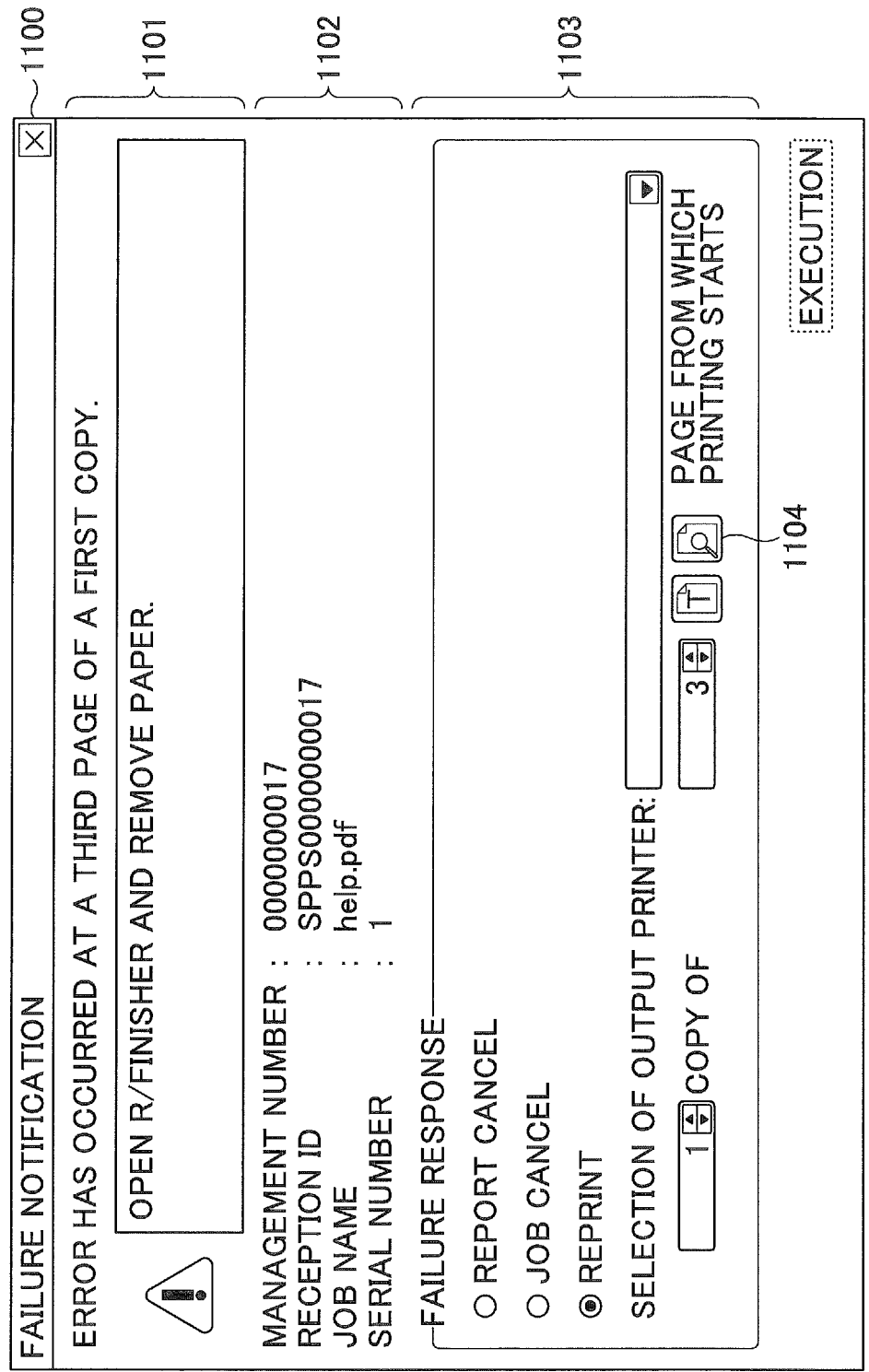
FIG. 11 is a conceptual diagram illustrating an example of a failure notification screen.

Next, a specific example of the failure notification screen 1000 shown in FIG. 8 will be described. FIG. 11 is a conceptual diagram illustrating an example of a failure notification screen 1100. Similar to the failure notification screen 1000 shown in FIG. 8, the failure notification screen 1100 shown in FIG. 11 is a configuration which includes a failure information displaying area 1101, a print job information displaying area 1102, and a failure response instruction area 1103.

In FIG. 11, the failure notification screen 1100 shows an example in which the error has occurred in the printer apparatus 14 at a third page of a first copy (a first edition) of the print job. In the failure information displaying area 1101, a message which indicates that the error has occurred in the printer apparatus 14 at the third page of the first copy of the print job is displayed. Further, in the print job information displaying area 1102, a management number, a reception ID, a job name, and a serial number are displayed as the identification information of the print job in which the error has occurred.

In the failure response instruction area 1103, a radiobox (radio button) for prompting the user to specify a report cancel, a job cancel, and a reprinting for performing the reprinting in which the start page is specified are arranged. The user may select the report cancellation, the job cancellation, or the reprinting in which the start page is specified as an instruction to cope with the failure, from the radiobox (radio button) arranged in the failure response instruction area 1103.

Further, in the failure response instruction area 1103, the preview button 1104 for starting the print preview screen is arranged. The user may easily display the preview image of the print job in which the error has occurred by pushing the preview button 1104 arranged in the failure notification screen 1100.

The preview image displayed at first may be a page being printed at the timing (point of time) when the error occurred or a page specified by a text box positioned at the left side of the preview button 1104.

The specification of the page with respect to the text box positioned at the left side of the preview button 1104 may be performed by the user. However, the page being printed at the timing when the error occurred may be specified as the default, for example. In other words, a value which indicates the page of the print data which page was being output by the printer apparatus 14 may be displayed in the text box as the default. This is because the preview image of the page which the user wants to confirm in a case in which the error has occurred is often the page being printed at the timing when the error occurred.

Thus, to specify the page being printed at the timing when the error occurred may omit the specifying operation of the page by the user. To use the failure notification screen 1100 shown in FIG. 11 may enable the user to call up easily the preview image displaying function of the print job in which the error has occurred.

Figure 12:
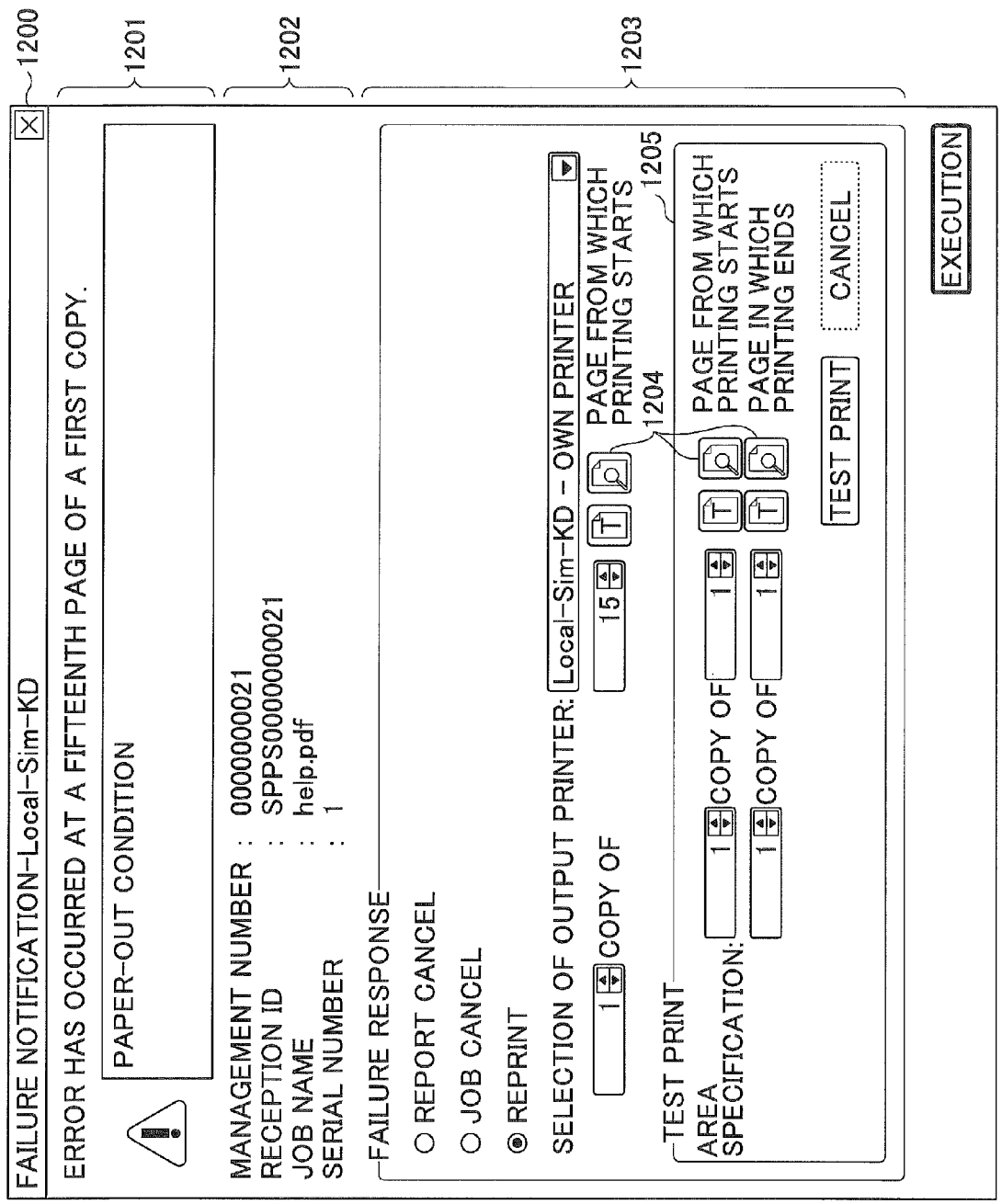
FIG. 12 is a conceptual diagram illustrating another example of a failure notification screen.

FIG. 12 is a conceptual diagram illustrating another example of a failure notification screen 1200. Similar to the failure notification screen 1100 shown in FIG. 11, the failure notification screen 1200 shown in FIG. 12 is a configuration which includes a failure information displaying area 1201, a print job information displaying area 1202, and a failure response instruction area 1203. The failure notification screen 1200 shown in FIG. 12 differs from the failure notification screen 1100 shown in FIG. 11 in that a test print instruction area 1205 is arranged in the failure response instruction area 1203.

The user may perform a test print by instructing from the test print instruction area 1205 before selecting any one of a report cancellation, a job cancellation, and a reprinting in which the start page is specified from the failure response instruction area 1203 as an instruction to cope with the failure. In the test print instruction area 1205, the text box for specifying the start page and the last page is arranged as an area specification of the test print. Further, in the test print instruction area 1205, the preview buttons 1204 are arranged at the right side of the text box for specifying the start page and the last page.

The user may easily display the preview image of the start page from which the test print is to be performed by pushing the preview button 1204 arranged at the right side of the text box for specifying the start page. Further, the user may easily display the preview image of the last page to which the test print is to be performed by pushing the preview buttons 1204 arranged at the right side of the text box for specifying the last page.

Another Embodiment

The print system 1 according to first embodiment has the configuration which includes the print client apparatus 10, the print server apparatus 12, and the printer apparatus 14 as shown in FIG. 1. As for another embodiment, the print system 1 may be a configuration in which the server function unit 45 shown in FIG. 5 is mounted on the print client apparatus 10 in order to omit the print server apparatus 12.

Figure 13:
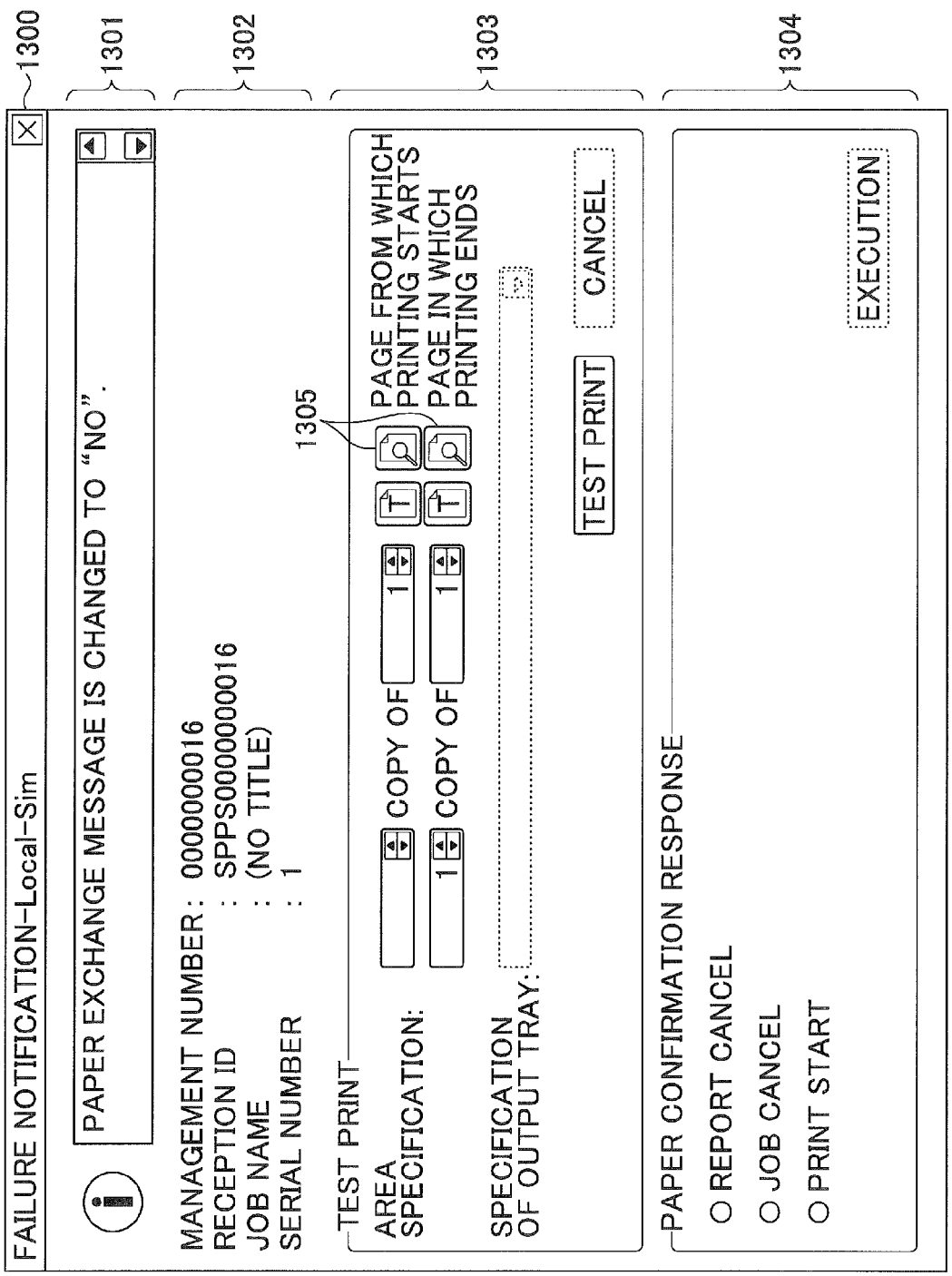
FIG. 13 is a conceptual diagram illustrating an example of a paper confirmation notification screen.

Further, in the above described first embodiment, the examples in which the user displays the preview image from the failure notification screen 1000, the failure notification screen 1100, and the failure notification screen 1200 have been described. However, some embodiments may display the preview image from a paper confirmation notification screen 1300 as shown in FIG. 13. The paper confirmation notification screen 1300 is a screen for prompting the user to confirm the paper (sheet) which is set in the printer apparatus 14.

The paper confirmation notification screen 1300 shown in FIG. 13 is a configuration which includes a paper confirmation information displaying area 1301, a print job information displaying area 1302, a test print instruction area 1303, and a paper confirmation response instruction area 1304. Similar to the failure notification screen 1200 shown in FIG. 12, the test print may be performed from the test print instruction area 1303 in the paper confirmation notification screen 1300 shown in FIG. 13. In the test print instruction area 1303, the text box for specifying the start page and the last page is arranged as an area specification of the test print.

Further, in the test print instruction area 1303, the preview button 1305 is arranged at the right side of the text box for specifying the start page and the last page. The user may easily display the preview image of the start page from which the test print is to be performed by pushing the preview button 1305 arranged at the right side of the text box for specifying the start page. Further, the user may easily display the preview image of the last page to which the test print is to be performed by pushing the preview button 1305 arranged at the right side of the text box for specifying the last page.

<Summary>

According to the above described embodiments, the user may easily display the preview image when the event in which the intervention of the user is required such as confirmation of papers, occurrence of failure, or the like is required has occurred after starting the printing. To make the preview image information for making a decision may enable the user to perform the instruction to cope with the failure or the confirmation of the papers appropriately.

For example, in a case in which the print data is a report of a CSV format, the user may specify the start page of the reprinting appropriately by displaying the preview image in order to confirm displaying content of each of the pages.

Further, the present invention is not limited to these embodiments, but various variations and modifications may be made without departing from the scope of the present invention. It should be noted that the printer communication unit 49 is an example of a detecting unit. The screen display units 22 and 24 are examples of screen display units. The print management unit 48 is an example of an output management unit. The failure notification screen 1000 and the paper confirmation notification screen 1300 are examples of notification screens.

The preview button 1011 and the preview button 1305 are examples of preview image displaying reception fields (units). The failure response instruction area 1003 and the paper confirmation response instruction area 1304 are examples of instruction reception fields (units). The print client apparatus 10 is an example of a terminal apparatus. The print server apparatus 12 is an example of an information processing apparatus. The printer apparatus 14 is an example of an output apparatus. The print data is an example of output data. The print management system 5 is an example of an output management system. The text box is an example an input box.

What is claimed is:

1. A non-transitory recording medium having a program recorded therein that is executable by a computer, the program when executed causing the computer to implement functions of:

a detection unit configured to detect an event which occurs in an output apparatus which outputs output data, intervention of a user being required in the event; and a screen displaying unit configured to display a notification screen, the notification screen including information relating to the event which occurred in the output apparatus, an instruction reception field configured to receive an instruction to cope with the event from the user, and a preview image displaying reception field configured to receive a request for displaying a preview image of the output data from the user, wherein the screen displaying unit is configured, in response to receiving the request for displaying the preview image of the output data from the user, to display the preview image of the output data which was being output by the output apparatus when the event occurred, wherein the screen displaying unit arranges an input box in the preview image displaying reception field, the input box being configured to receive, from the user, a specification of a page of the output data for the preview image, and wherein a value which indicates a page of the output data which page was being output by the output apparatus when the event occurred is displayed in the input box as default.

2. The non-transitory recording medium as claimed in claim 1, wherein the detection unit is configured to detect failure which occurs in the output apparatus as the event in which the intervention of the user is required.

3. The non-transitory recording medium as claimed in claim 1, wherein the detection unit is configured to detect notification of paper confirmation for prompting the user to confirm a paper which is set in the output apparatus as the event in which the intervention of the user is required.

4. An information processing apparatus comprising:

a detection unit configured to detect an event which occurs in an output apparatus which outputs output data, intervention of a user being required in the event; and a screen displaying unit configured to display a notification screen, the notification screen including information relating to the event which occurred in the output apparatus, an instruction reception field configured to receive an instruction to cope with the event from the user, and a preview image displaying reception field configured to receive a request for displaying a preview image of the output data from the user, wherein the screen displaying unit is configured, in response to receiving the request for displaying the preview image of the output data from the user, to display the preview image of the output data which was being output by the output apparatus when the event occurred, wherein the screen displaying unit arranges an input box in the preview image displaying reception field, the input box being configured to receive, from the user, a specification of a page of the output data for the preview image, and wherein a value which indicates a page of the output data which page was being output by the output apparatus when the event occurred is displayed in the input box as default.

5. An output management method executed in an output management system, the output management system including a terminal apparatus operated by a user and an information processing apparatus for managing output data from an output apparatus, the output management method comprising:

a step of detecting an event which occurs in the output apparatus, intervention of the user being required in the event; and a step of displaying a notification screen, the notification screen including information relating to the event which occurred in the output apparatus, an instruction reception field configured to receive an instruction to cope with the event from the user, and a preview image displaying reception field configured to receive a request for displaying a preview image of the output data from the user, wherein the step of displaying the notification screen is performed in response to receiving the request for displaying the preview image of the output data from the user by displaying the preview image of the output data which was being output by the output apparatus when the event occurred, wherein the screen displaying unit arranges an input box in the preview image displaying reception field, the input box being configured to receive, from the user, a specification of a page of the output data for the preview image, and wherein a value which indicates a page of the output data which page was being output by the output apparatus when the event occurred is displayed in the input box as default.

* * * * *